United States Patent
Darr et al.

(10) Patent No.: US 7,932,805 B2
(45) Date of Patent: Apr. 26, 2011

(54) FUSE WITH FUSE STATE INDICATOR

(75) Inventors: Matthew R. Darr, Godfrey, IL (US);
Jaime A. Torrez, O'Fallon, MO (US);
Anthony C. Ban, Foley, MO (US);
Robert S. Douglass, Wildwood, MO (US); John M. Ackermann, Belleville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/868,298

(22) Filed: Aug. 25, 2010

(65) Prior Publication Data
US 2010/0328019 A1      Dec. 30, 2010

(51) Int. Cl.
*H01H 85/30*    (2006.01)
(52) U.S. Cl. ........ 337/243; 337/241; 337/206; 337/265; 116/206; 116/207; 324/507; 324/550; 340/638
(58) Field of Classification Search ................... 337/241, 337/242, 245, 265, 206, 243, 248–252, 187; 116/206, 207; 324/507, 550; 439/491; 340/638, 340/639
See application file for complete search history.

(56) References Cited

U.S. PATENT DOCUMENTS

| | | |
|---|---|---|
| 1,591,029 A | 7/1926 | Feldkamp |
| 2,945,305 A | 7/1960 | Strickler |
| 4,070,912 A | 1/1978 | McNaughtan et al. |
| 4,308,516 A | 12/1981 | Shimada et al. |
| 4,339,207 A | 7/1982 | Hof et al. |
| 4,468,137 A | 8/1984 | Hilsum et al. |
| 4,538,926 A | 9/1985 | Chretien |
| 4,929,090 A | 5/1990 | Grahm |
| 5,111,177 A | 5/1992 | Krueger et al. |
| 5,738,442 A | 4/1998 | Paron et al. |
| 5,776,371 A | 7/1998 | Parker |
| 5,821,849 A | 10/1998 | Dietsch et al. |
| 5,841,337 A | 11/1998 | Douglass |
| 5,936,508 A | 8/1999 | Parker |

(Continued)

FOREIGN PATENT DOCUMENTS

DE          711966 C       10/1941

(Continued)

OTHER PUBLICATIONS

International Search Report of PCT/US2008/081347; Jan. 20, 2009; 7 pages.

(Continued)

*Primary Examiner* — Anatoly Vortman
(74) *Attorney, Agent, or Firm* — Armstrong Teasdale LLP

(57) ABSTRACT

A fuse includes a fuse state indicator on the exterior surface of the fuse body. The fuse state indicator includes an electrically conductive element electrically connected to and extending between the terminal elements. A temperature sensitive element proximate and in thermal contact with the electrically conductive element includes material capable of changing color when heated to a predetermined transition temperature to form a mark on the temperature sensitive element. The fuse state indicator forms a first mark on the temperature sensitive element when heat from the electrically conductive element transfers to the temperature sensitive element in response to a first overcurrent condition, and forms a second mark, distinct from the first mark, on the temperature sensitive element when heat from the electrically conductive element transfers to the temperature sensitive element in response to a second overcurrent condition distinct from the first overcurrent condition.

30 Claims, 11 Drawing Sheets

U.S. PATENT DOCUMENTS

| | | | |
|---|---|---|---|
| 5,994,993 A | 11/1999 | Castonguay, Jr. et al. | |
| 6,114,941 A | 9/2000 | Scott | |
| 6,292,087 B1 | 9/2001 | Castonguay, Jr. et al. | |
| 6,373,370 B1* | 4/2002 | Darr et al. | 337/243 |
| 6,456,189 B1 | 9/2002 | Mosesian et al. | |
| 6,809,627 B2 | 10/2004 | Castonguay, Jr. et al. | |
| 6,836,206 B2* | 12/2004 | Lee | 337/243 |
| 6,859,131 B2* | 2/2005 | Stanek et al. | 337/206 |
| 7,369,030 B2* | 5/2008 | Darr | 337/243 |
| 7,405,646 B2* | 7/2008 | Kennedy et al. | 337/243 |
| 7,636,028 B2* | 12/2009 | Rodseth et al. | 337/243 |
| 2004/0000983 A1 | 1/2004 | Kennedy et al. | |
| 2005/0062578 A1 | 3/2005 | Ackermann | |
| 2006/0040546 A1 | 2/2006 | Werthman et al. | |
| 2008/0232427 A1 | 9/2008 | Leute et al. | |
| 2009/0108983 A1 | 4/2009 | Darr et al. | |

FOREIGN PATENT DOCUMENTS

| | | |
|---|---|---|
| DE | 8215732 | 5/1984 |
| DE | 8514462 | 2/1987 |
| GB | 517905 A | 2/1940 |
| GB | 575936 A | 3/1946 |
| GB | 594736 | 11/1947 |
| GB | 2135874 | 9/1984 |
| JP | 52141281 | 11/1977 |
| WO | WO 89/04532 | 5/1989 |
| WO | 9930337 A2 | 6/1999 |

OTHER PUBLICATIONS

International Search Report and Written Opinion of PCT/US2008/081347; Mar. 16, 2009; 17 pages.

International Search report and Written Opinion of PCT/US2008/080441; Feb. 16, 2009; 12 pages.

* cited by examiner

FUSE WITH FUSE STATE INDICATOR

CROSS REFERENCE TO RELATED APPLICATIONS

This application claims priority to U.S. patent application Ser. No. 11/939,981, filed Nov. 14, 2007 and issued as U.S. Pat. No. 7,812,704, the entirety of which is incorporated herein by reference.

BACKGROUND OF THE INVENTION

This invention relates generally to fuses and, more particularly, to fuses with a fuse state indicator.

BRIEF DESCRIPTION OF THE DRAWINGS

The foregoing and other features and aspects of the invention will be best understood with reference to the following description of certain exemplary embodiments of the invention, when read in conjunction with the accompanying drawings, wherein.

DETAILED DESCRIPTION OF THE INVENTION

Figure 1:
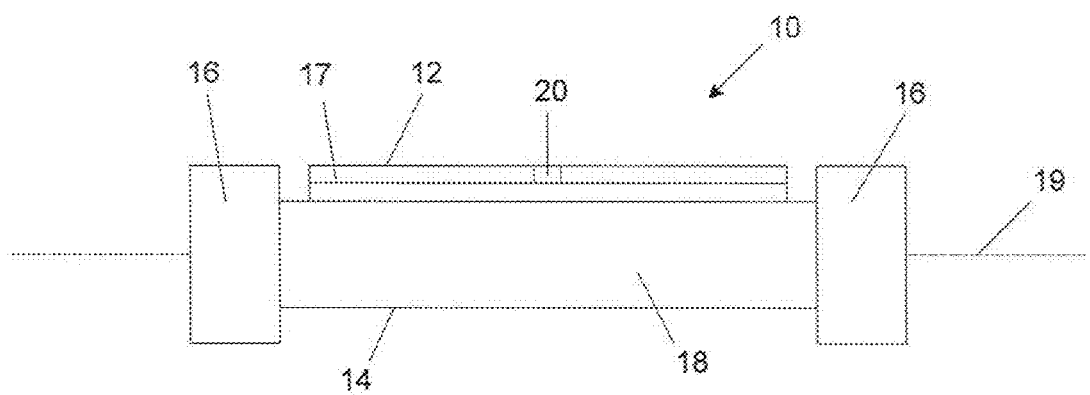
FIG. 1 is a plan view of a fuse comprising a fuse state indicator that responds to temperature in accordance with an exemplary embodiment.

FIG. 1 is a plan view of a fuse 10 comprising a fuse state indicator 12 that responds to temperature in accordance with an exemplary embodiment. The fuse 10 includes an insulative (i.e., nonconductive) fuse body 14 and conductive ferrules 16 attached thereto on either end thereof. The fuse state indicator 12 extends on an outer surface 18 of the fuse body 14 between the ferrules 16 and is electrically connected to the ferrules 16 by a wire 17. The fuse body 14 is elongated in the direction of a longitudinal axis 19 and is generally cylindrical in the illustrated embodiment. It is appreciated that the benefits of the instant invention may also apply to non-cylindrical fuses, including but not limited to rectangular fuses, in alternative embodiments. Further, it is understood that the Invention is applicable to a wide variety of fuses intended for a wide variety of applications and having a wide variety of fuse ratings. Therefore, the embodiments of the invention shown and described herein are for illustrative purposes only, and the invention is not intended to be restricted to a particular fuse type, class, or rating.

In an exemplary embodiment, the ferrules 16 are generally cylindrical and complementary in shape to the fuse body 14. It is, however, appreciated that the benefits of the instant invention may also apply to non-cylindrical ferrules, including but not limited to rectangular ferrules, in alternative embodiments.

The fuse state indicator 12 comprises at least one temperature sensitive element 20 capable of undergoing a visible change upon being subjected to a threshold temperature. The temperature sensitive element 20 is adapted to visibly indicate the state of fuse 10. The state of fuse 10 may be indicated as a good fuse, an overload open fuse, a short circuit open fuse, and/or thermal stress and/or open fuse. Other fuse states and other descriptions for the fuse states may be used in alternative embodiments without departing from the scope and spirit of the exemplary embodiment. The temperature sensitive element 20 may be employed as part of the fuse state indicator 12 coupled to the outer surface 18 of the fuse 10 or the temperature sensitive element 20 may be employed independently. The temperature sensitive element 20 is coupled to the outer surface 18 of the fuse body 14 between the ferrules 16, but is not electrically connected to the ferrules 16 by the wire 17. The temperature sensitive element 20 is positioned on or in close proximity to the wire 17 so that it may detect the heat emanating from the wire 17. The heat is generated by the current passing through the wire 17 and is dependent upon the resistance of that wire 17. The wire 17 is designed so that it melts or becomes disconnected once a short circuit or a harmful overload condition occurs. In one embodiment, the wire 17 comprises a NiChrome alloy that melts above 1000° C. It should be understood that the wire may be constructed of other materials capable of melting, when exposed to a harmful overload condition, without departing from the scope and spirit of the exemplary embodiment.

Figure 2:
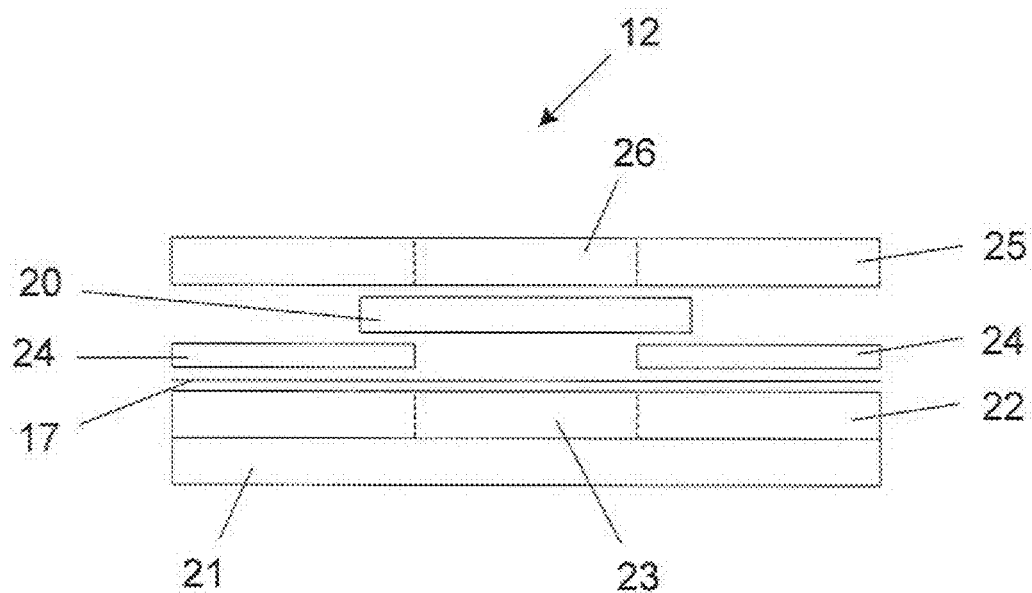
FIG. 2 is a cross sectional view of a fuse state indicator in accordance with an exemplary embodiment.

FIG. 2 is a cross sectional view of a fuse state indicator 12 in accordance with an exemplary embodiment. In this embodiment, the fuse state indicator 12 comprises a clear laminate 21, a print ink 22, a wire 17, at least one foil 24 and a temperature sensitive element 20. The print ink 22 comprises an adhesive (not shown) positioned adjacent to the clear laminate 21, wherein the print ink 22 has a first window 23 defined therewithin. The wire 17 is electrically coupled to the ferrules 16 (FIG. 1) and passes longitudinally across the first window 23. The wire 17 may be positioned adjacent to the print ink 22. The at least one foil 24 may be coupled to the portion of the wire 17 that is not passing longitudinally across the first window 23. The temperature sensitive element 20 may be coupled to at least the portion of the wire 17 that passes longitudinally across the first window 23. The fuse state indicator 12 may further comprise a label 25 positioned adjacent to the temperature sensitive element 20, wherein the label 25 has a second window 26 defined therewithin. The second window 26 may be positioned above the temperature sensitive element 20 such that the temperature sensitive element 20 may be visible while viewing through the second window 26. In this exemplary embodiment, the temperature sensitive element 20 comprises thermographic paper.

The foil 24 is designed to protect an operator from exposure to excessive temperatures from the wire 17 while handling fuse 10. The foil 24 may comprise any material capable of insulating the heat, including, but not limited to, copper foil or any thick film, without departing from the scope and spirit of the exemplary embodiment.

Figure 3A:
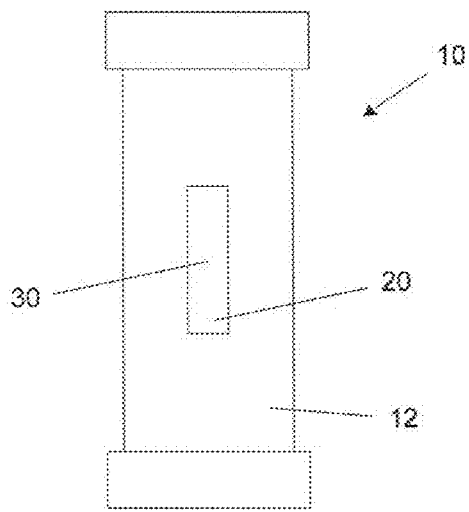
FIG. 3A is a top view of a fuse comprising a fuse state indicator displaying a good fuse state in accordance with an exemplary embodiment.

FIGS. 3A-3D illustrate a top view of a fuse 10 comprising a fuse state indicator 12 displaying various fuse states in accordance with an exemplary embodiment. FIG. 3A is a top view of a fuse 10 comprising a fuse state indicator 12 displaying a good fuse state 30. The good fuse state 30 is indicated on the thermographic paper 20 as being entirely clear or having a faint wire line barely noticeable by an operator.

Figure 3B:
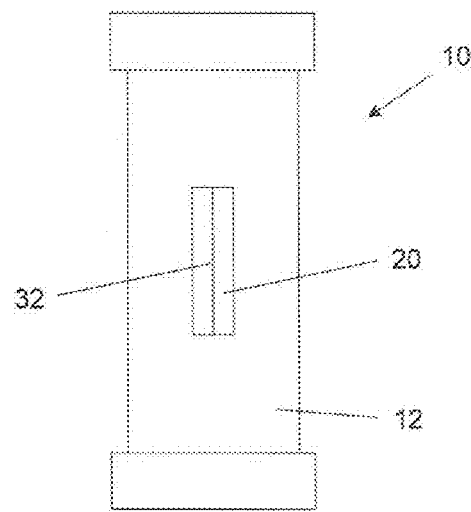
FIG. 3B is a top view of a fuse comprising a fuse state indicator displaying an overload open fuse state in accordance with an exemplary embodiment.

FIG. 3B is a top view of a fuse 10 comprising a fuse state indicator 12 displaying an overload open fuse state 32. The overload open fuse state 32 is indicated on the thermographic paper 20 as being a thin wire line.

Figure 3C:
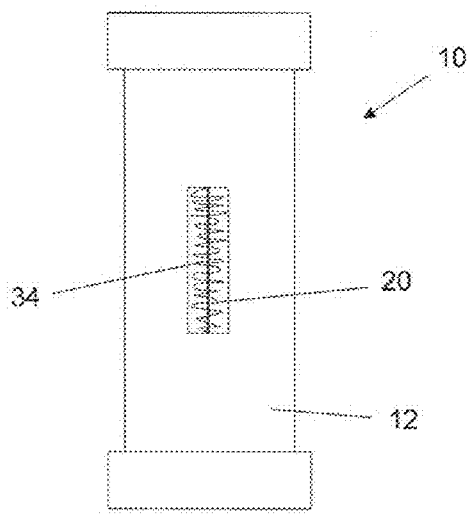
FIG. 3C is a top view of a fuse comprising a fuse state indicator displaying a short circuit open fuse state in accordance with an exemplary embodiment.

FIG. 3C is a top view cia fuse 10 comprising a fuse state indicator 12 displaying a short circuit open fuse state 34. The short circuit open fuse state 34 is indicated on the thermographic paper 20 as a thicker wire line comprising intersecting wavy lines.

Figure 3D:
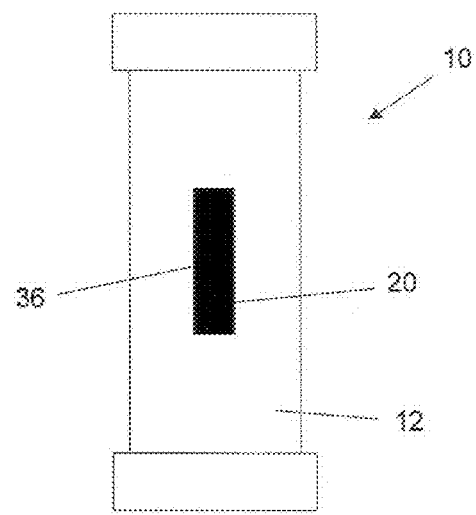
FIG. 3D is a top view of a fuse comprising a fuse state indicator displaying a thermal stress and/or open fuse state in accordance with an exemplary embodiment.

FIG. 3D is a top view of a fuse 10 comprising a fuse state indicator 12 displaying a thermal stress and/or open fuse state. The thermal stress and/or open fuse state 36 is indicated on the thermographic paper 20 as a black mark.

Although the exemplary embodiment described above has illustrated that certain markings have corresponding fuse state meanings, the same or similar marking may be given a different fuse state meaning in alternative embodiments without departing from the scope and spirit of the exemplary embodiment.

In an exemplary embodiment, the 80% current fuse tube temperatures may range from about 35° C. to about 65° C. depending upon the location of the measurement. Additionally, the 500% overload fuse tube temperatures may range from about 45° C. to about 90° C. depending upon the location of the measurement. However, at a particular location, the temperatures may be more consistent. It should be understood that these ranges may differ among different fuse types, classes and ratings without departing from the scope and spirit of the exemplary embodiment.

Figure 4A:
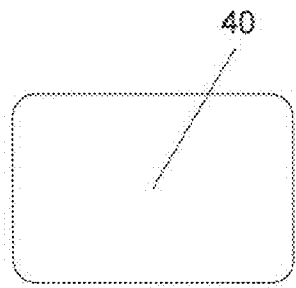
FIG. 4A is a photographic view of a temperature sensitive element displaying a good fuse state in accordance with an exemplary embodiment.
Figure 4B:
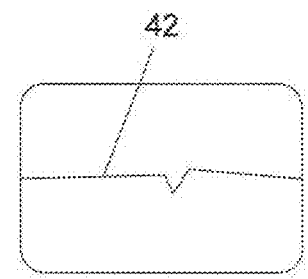
FIG. 4B is a photographic view of a temperature sensitive element displaying a 200% overload fuse state in accordance with an exemplary embodiment.
Figure 4C:
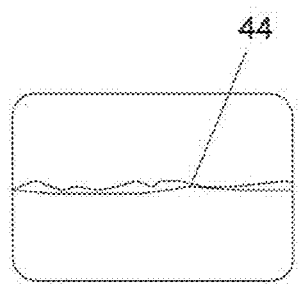
FIG. 4C is a photographic view of a temperature sensitive element displaying a 1200 A overload fuse state in accordance with an exemplary embodiment.
Figure 4D:
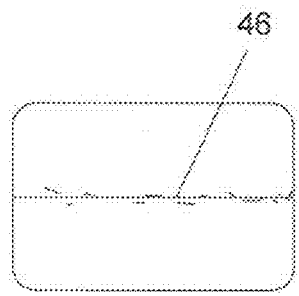
FIG. 4D is a photographic view of a temperature sensitive element displaying a 2400 A short circuit fuse state in accordance with an exemplary embodiment.
Figure 4E:
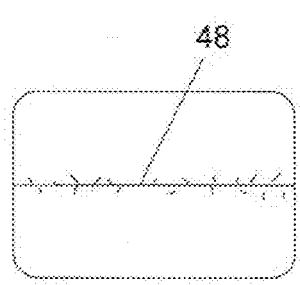
FIG. 4E is a photographic view of a temperature sensitive element displaying a 10 KA short circuit fuse state in accordance with an exemplary embodiment.
Figure 4F:
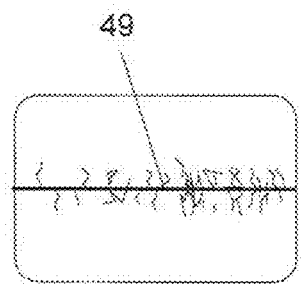
FIG. 4F is a photographic view of a temperature sensitive element displaying a 100 KA short circuit fuse state in accordance with an exemplary embodiment.

FIGS. 4A-4F illustrate photographic views of a temperature sensitive element displaying various fuse states in accordance with an exemplary embodiment. These photographic views were taken during an experiment on a GT3-FRS-R-30 fuse, which is manufactured by Cooper Bussmann, Inc. FIG. 4A is a photographic view of a temperature sensitive element displaying a good fuse state 40. FIG. 4B is a photographic view of a temperature sensitive element displaying a 200% overload fuse state 42. FIG. 4C is a photographic view of a temperature sensitive element displaying a 1200 A overload fuse state 44. FIG. 4D is a photographic view of a temperature sensitive element displaying a 2400 A short circuit fuse state 46. FIG. 4E is a photographic view of a temperature sensitive element displaying a 10 KA short circuit fuse state 48. FIG. 4F is a photographic view of a temperature sensitive element displaying a 100 KA short circuit fuse state 49. FIGS. 4A-4F illustrate the various responses of the temperature sensitive element 20 to the heat generated by the wire 17, which is positioned underneath the temperature sensitive element 20. As the amperage flowing across the wire 17 increases, the heat generated from the wire 17 also increases. Consequently, the increased heat causes the markings on the temperature sensitive element 20 to become more pronounced. Although this embodiment has the wire located underneath the temperature sensitive element, alternative embodiments may have the wire located on top of the temperature sensitive element without departing from the scope and spirit of the exemplary embodiment.

In an alternative embodiment, the temperature sensitive element 20 of the fuse state indicator 12 may comprise at least one material selected from a group consisting of thermochromic ink, thermochromic paint, thermal paper, liquid crystal polymers, thermal calibrated wax, nitrocellulose, and any substance that may be consumed and or out gas upon exposure to high temperatures, which are all capable of indicating a fuse state upon exposure to a particular temperature range.

Thermochromic inks or dyes are temperature sensitive compounds that temporarily change color with exposure to heat. When using the thermochromic inks or dyes, the color of the ink may change when exposed to the heat generated from the fuse 10 and/or the wire 17 while the fuse 10 is operating. The wire 17 is designed to disintegrate when the fuse 10 experiences a short circuit or a harmful overload condition and may then stop generating heat. Therefore, when the fuse 10 is not operating, either due to an open fuse, a fuse that has been installed improperly or an open circuit, the color of the ink may be its original color. This color change may be reversible and may allow an operator to easily diagnose the state of the fuse 10.

Thermochromic paints are temperature sensitive pigments that temporarily change color with exposure to heat—After absorbing a certain amount of light or heat, the crystallic or molecular structure of the pigment reversibly changes in such a way that it absorbs and emits light at a different wavelength than at lower temperatures. When using the thermochromic paints, the color of the paint may change when exposed to the heat generated from the fuse 10 and/or the wire 17 while the fuse 10 is operating. The wire 17 is designed to disintegrate when the fuse 10 experiences a short circuit or a harmful overload condition and may then stop generating heat. Therefore, when the fuse 10 is not operating, either due to an open fuse, a fuse that has been installed improperly or an open circuit, the color of the paint may be its original color. This color change may be reversible and may allow an operator to easily diagnose the state of the fuse 10.

Thermal papers comprise one or more temperature sensitive chemicals that change color with exposure to heat. One example of a thermal paper includes paper impregnated with a solid mixture of a fluoran dye with octadecylphosphonic acid. This mixture is stable in solid phase. However, when the octadecylphosphonic acid is melted, the dye undergoes chemical reaction in the liquid phase, and assumes the protonated colored form. Since this color change may not be reversible, the thermal paper may be used to indicate a short circuit or an overload. There may be some color change during normal operation, but the intensity of the color change may increase as the temperature rises into the temperature range associated with a short circuit or an overload. In one embodiment, the thermal paper has a transition temperature between about 100° C. to about 120° C. It should be understood, however, that alternative thermal papers may be used having different transition temperatures without departing from the scope and spirit of the exemplary embodiment.

Figure 5:
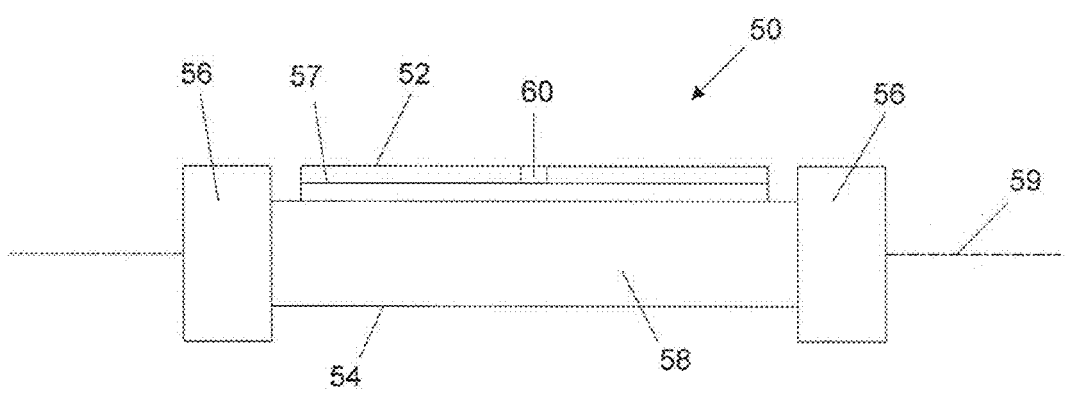
FIG. 5 is a plan view of a fuse comprising a fuse state indicator that responds to voltage in accordance with an exemplary embodiment.

FIG. 5 is a plan view of a fuse 50 comprising a fuse state indicator 52 that responds to voltage in accordance with an exemplary embodiment The fuse 50 includes an insulative (i.e., nonconductive) fuse body 54 and conductive ferrules 56 attached thereto on either end thereof. The fuse state indicator 52 extends on an outer surface 58 of the fuse body 54 between the ferrules 56 and is electrically connected to the ferrules 56 by a wire 57. The fuse body 54 is elongated in the direction of a longitudinal axis 59 and is generally cylindrical in the illustrated embodiment. It is appreciated that the benefits of the instant invention may also apply to non-cylindrical fuses, including but not limited to rectangular fuses, in alternative embodiments. Further, it is understood that the invention is applicable to a wide variety of fuses intended for a wide variety of applications and having a wide variety of fuse ratings. Therefore, the embodiments of the invention shown and described herein are for illustrative purposes only, and the invention is not intended to be restricted to a particular fuse type, class or rating.

In an exemplary embodiment, the ferrules 56 are generally cylindrical and complementary in shape to the fuse body 54. It is, however, appreciated that the benefits of the instant invention may also apply to non-cylindrical ferrules, including but not limited to rectangular ferrules, in alternative embodiments.

The fuse state indicator 52 comprises at least one voltage sensitive element 60 capable of undergoing a visible change upon being subjected to a voltage. The voltage sensitive element 60 is adapted to visibly indicate the state of fuse 50. The state of fuse 50 may be indicated as operable or inoperable.

The voltage sensitive element 60 may be employed as part of the fuse state indicator 52 coupled to the outer surface 58 of the fuse 50 or the voltage sensitive element 60 may be employed independently. The voltage sensitive element 60 is coupled to the outer surface 58 of the fuse body 54 between the ferrules 56 and is electrically connected to the ferrules 56 by the wire 57. The voltage sensitive element 60 may indicate a change in the state of the fuse 50 upon exposure to voltage. The voltage sensitive element 60 may also indicate a change in the state of the fuse 50 upon exposure to heat which may or may not be caused by resistive heating of the wire 17. The wire 57 is designed so that it melts or becomes disconnected once a short circuit or a harmful overload condition occurs. In one embodiment, the wire 57 comprises a NiChrome alloy that melts above 1000° C. It should be understood that the wire may be constructed of other materials capable of melting, when exposed to a harmful overload condition, without departing from the scope and spirit of the exemplary embodiment.

Figure 6:
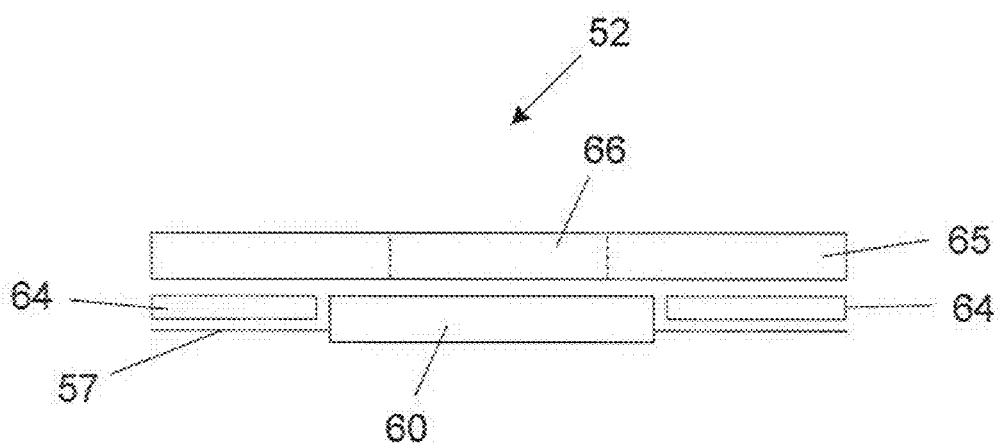
FIG. 6 is a cross sectional view of a fuse state indicator in accordance with an exemplary embodiment.

FIG. 6 is a cross sectional view of a fuse state indicator 52 in accordance with an exemplary embodiment. In this embodiment, the fuse state indicator 52 comprises a voltage sensitive element 60, a wire 57 electrically coupling the ferrules 56 (FIG. 5) to the voltage sensitive element 60, and at least one foil 64 coupled to the wire 57. The fuse state indicator 52 may further comprise a label 65 positioned adjacent to the voltage sensitive element 60, wherein the label 65 has a window 66 defined therewithin. The window 66 may be positioned above the voltage sensitive element 60 such that the voltage sensitive element 60 is visible through the window 66.

The foil 64 is designed to protect an operator from exposure to excessive temperatures from the wire 57 while handling fuse 50. The foil 64 is designed to insulate the temperature from being too hot when an operator handles the fuse 50. The foil 64 may comprise any material capable of insulating the heat, including, but not limited to, copper foil or any thick film, without departing from the scope and spirit of the exemplary embodiment.

Figure 7A:
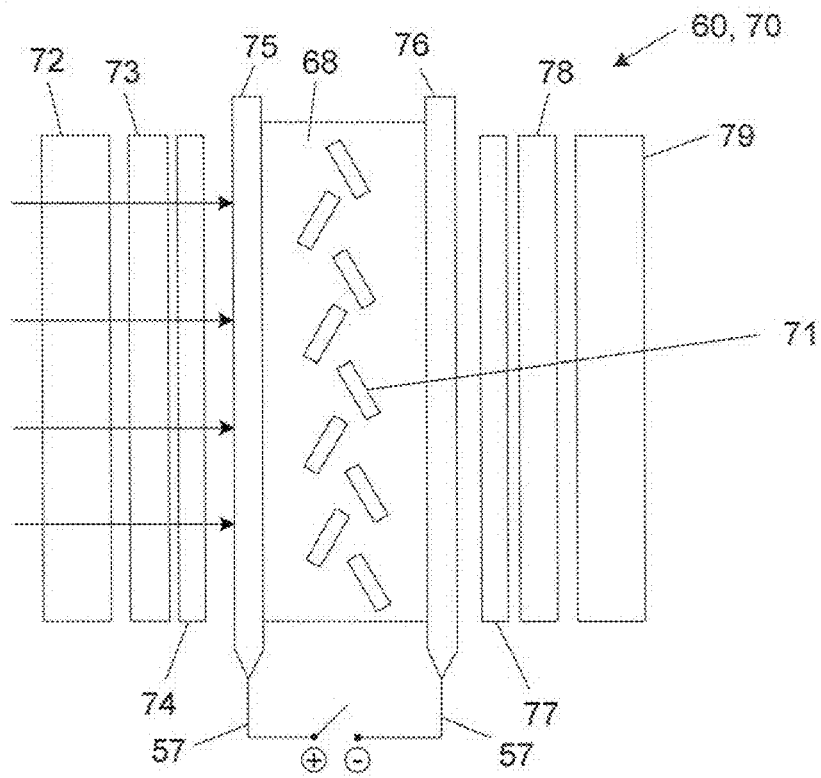
FIG. 7A is a perspective view of a smart window showing the orientation of a plurality of polymer dispersed liquid crystals when there is no voltage flowing across the smart window in accordance with an exemplary embodiment.
Figure 7B:
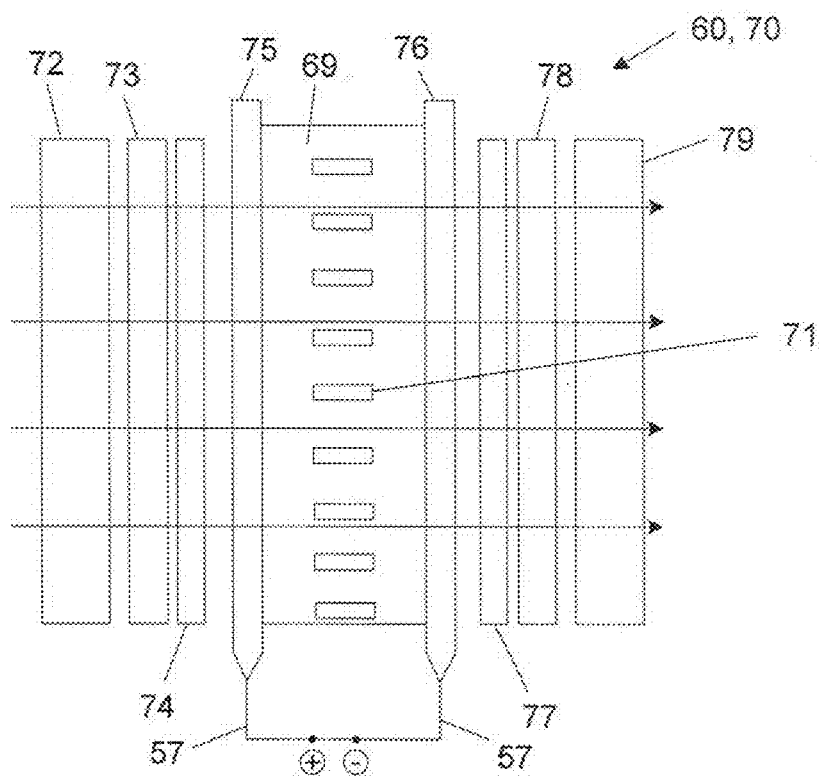
FIG. 7B is a perspective view of a smart window showing the orientation of a plurality of polymer dispersed liquid crystals when there is voltage flowing across the smart window in accordance with an exemplary embodiment.

Referring now to FIGS. 7A and 7B, the voltage sensitive element 60 is illustrated and its operation is described hereinbelow in accordance with an exemplary embodiment. In this embodiment, the voltage sensitive element 60 comprises a smart window 70. FIG. 7A is a perspective view of a smart window 70 showing the orientation of a plurality of polymer dispersed liquid crystals 71 when there is no voltage flowing across the smart window 70 in accordance with an exemplary embodiment. FIG. 7B is a perspective view of a smart window 70 showing the orientation of a plurality of polymer dispersed liquid crystals 71 when there is voltage flowing across the smart window 70 in accordance with an exemplary embodiment.

As illustrated in these figures, the smart window 70 comprises a transparent lens 72, a first interlayer film 73 adjacent to the transparent lens 72, a first liquid crystal film 74 adjacent to the first interlayer film 73, a first conductive coating 75 adjacent to the first liquid crystal film 74, a plurality of polymer dispersed liquid crystals 71 adjacent to the first conductive coating 75, a second conductive coating 76 adjacent to the plurality of polymer dispersed liquid crystals 71, a second liquid crystal film 77 adjacent to the second conductive coating 76, a second interlayer film 78 adjacent to the second liquid crystal film 77 and a backing layer 79 adjacent to the second interlayer film 78.

These polymer dispersed liquid crystals 71 are liquid crystals capable of changing its orientation from a first orientation 68, wherein a substantial portion of the light does not pass through the layer of polymer dispersed liquid crystals 71, to a second orientation 69, wherein a substantial portion of the light passes through the layer of polymer dispersed liquid crystals 71. The polymer dispersed liquid crystals 71 are positioned in the first orientation 68 when an electrical charge is absent, which results when the fuse is in an inoperable state. Thus, when the fuse is in an inoperable state, the polymer dispersed liquid crystals 71 may be opaque thereby preventing the operator from viewing the backing layer 79. However, the polymer dispersed liquid crystals 71 are positioned in the second orientation 69, positioned parallel to one another, when an electrical charge is present, which results when the fuse is in an operable state. Thus, when the fuse is in an operable state, the polymer dispersed liquid crystals 71 may be translucent thereby allowing the operator to view the backing layer 79. Hence, when using polymer dispersed liquid crystals 71, the polymer dispersed liquid crystals 71 are either opaque (fuse is in an inoperable state) or translucent (fuse is in an operable state).

The electrical charge does not flow through the wire 57, which is electrically connected to the smart window 70, when the fuse is inoperable, which may result from an improperly installed fuse, an off circuit, or a fuse wherein the wire 57 may be melted or broken off due to a short circuit or an overcurrent. The electrical charge flows through the wire 57, which is electrically connected to the smart window 70, when the fuse is operable.

Although the embodiment described above illustrates that an electrical charge does not flow through the wire 57 when the fuse is inoperable, while an electrical charge flows through the wire 57 when the fuse is operable, the fuse and wire 57 may be designed such that the reverse occurs without departing from the scope and spirit of the exemplary embodiment. Specifically, the fuse and wire 57 may be designed so that an electrical charge flows through the wire 57 when the fuse is inoperable, while an electrical charge does not flow through the wire 57 when the fuse is operable.

Figure 8A:
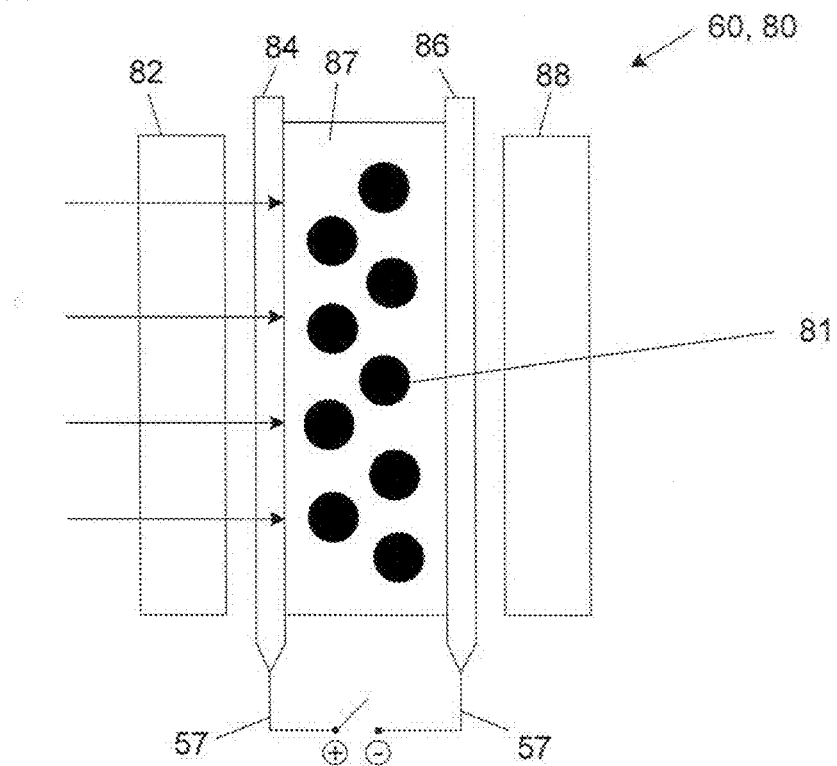
FIG. 8A is a perspective view of a smart window showing the orientation of a plurality of suspended particle devices when there is no voltage flowing across the smart window in accordance with an exemplary embodiment.
Figure 8B:
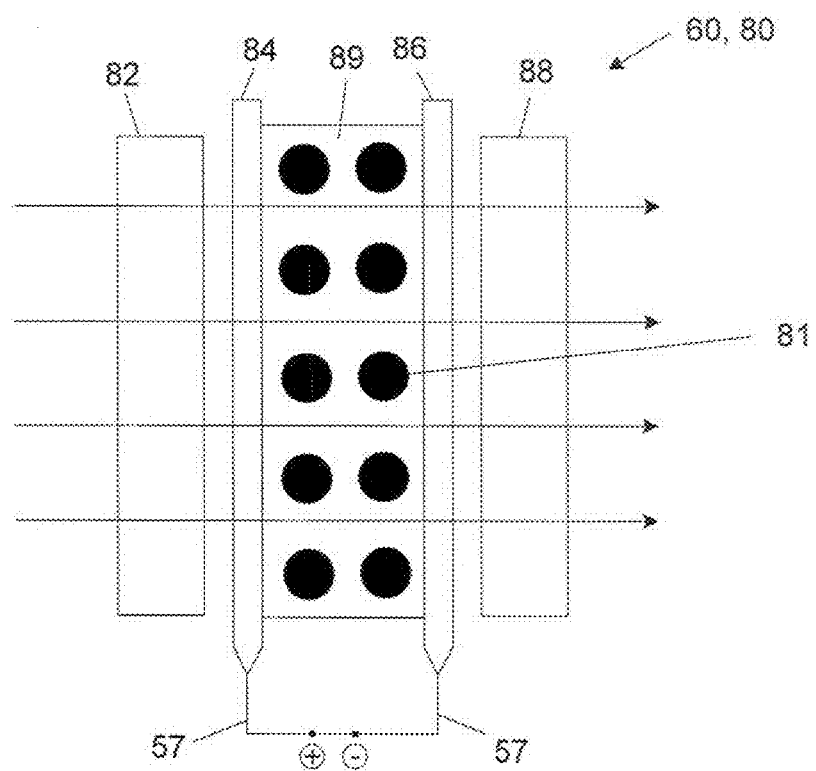
FIG. 8B is a perspective view of a smart window showing the orientation of a plurality of suspended particle devices when there is voltage flowing across the smart window in accordance with an exemplary embodiment.

Referring now to FIGS. 8A and 8B, another embodiment of the voltage sensitive element 60 is illustrated and its operation is described hereinbelow. In this embodiment, the voltage sensitive element 60 comprises a smart window 80. FIG. 8A is a perspective view of a smart window 80 showing the orientation of a plurality of suspended particle devices 81 when there is no voltage flowing across the smart window 80 in accordance with an exemplary embodiment. FIG. 8B is a perspective view of a smart window 80 showing the orientation of a plurality of suspended particle devices 81 when there is voltage flowing across the smart window 80 in accordance with an exemplary embodiment.

As illustrated in these figures, the smart window 80 comprises a transparent lens 82, a first conductive coating 84 adjacent to the transparent lens 82, a plurality of suspended particle devices 81 adjacent to the first conductive coating 84, a second conductive coating 86 adjacent to the plurality of suspended particle devices 81, and a backing layer 88 adjacent to the second conductive coating 86.

These suspended particle devices 81 are capable of changing orientation from a first orientation 87, wherein a substantial portion of the light does not pass through the layer of suspended particle devices 81, to a second orientation 89, wherein a substantial portion of the light passes through the layer of suspended particle devices 81. The suspended particle devices 81 are positioned in the first orientation 87 when an electrical charge is absent, which results when the fuse is in an inoperable state. Thus, when the fuse is in an inoperable state, the suspended particle devices 81 may be opaque thereby preventing the operator from viewing the backing layer 88. However, the suspended particle devices 81 are positioned in the second orientation 89, positioned in alignment with one another, when an electrical charge is present, which results when the fuse is in an operable state. Thus, when the fuse is in an operable state, the suspended particle device 81 may be translucent thereby allowing the operator to view the backing layer 88. Hence, when using suspended particle devices 81, the suspended particle devices 81 are either opaque (fuse is in an inoperable state) or translucent (fuse is in an operable state).

The electrical charge does not flow through the wire 57, which is electrically connected to the smart window 80, when the fuse is inoperable, which may result from an improperly installed fuse, an off circuit, or a fuse wherein the wire 57 may be melted or broken off due to a short circuit or an overcurrent. The electrical charge flows through the wire 57, which is electrically connected to the smart window 80, when the fuse is operable.

Although the embodiment described above illustrates that an electrical charge does not flow through the wire 57 when the fuse is inoperable, while an electrical charge flows through the wire 57 when the fuse is operable, the fuse and wire 57 may be designed such that the reverse occurs without departing from the scope and spirit of the exemplary embodiment. Specifically, the fuse and wire 57 may be designed so that an electrical charge flows through the wire 57 when the fuse is inoperable, while an electrical charge does not flow through the wire 57 when the fuse is operable.

Figure 9:
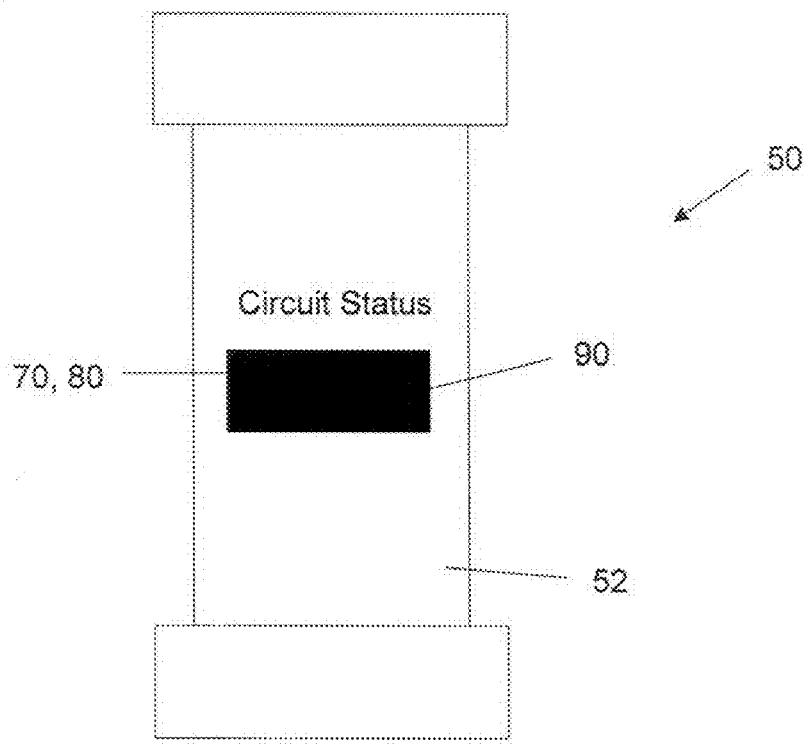
FIG. 9 is a top view of a fuse comprising a fuse state indicator displaying an inoperable fuse state in accordance with an exemplary embodiment.
Figure 10:
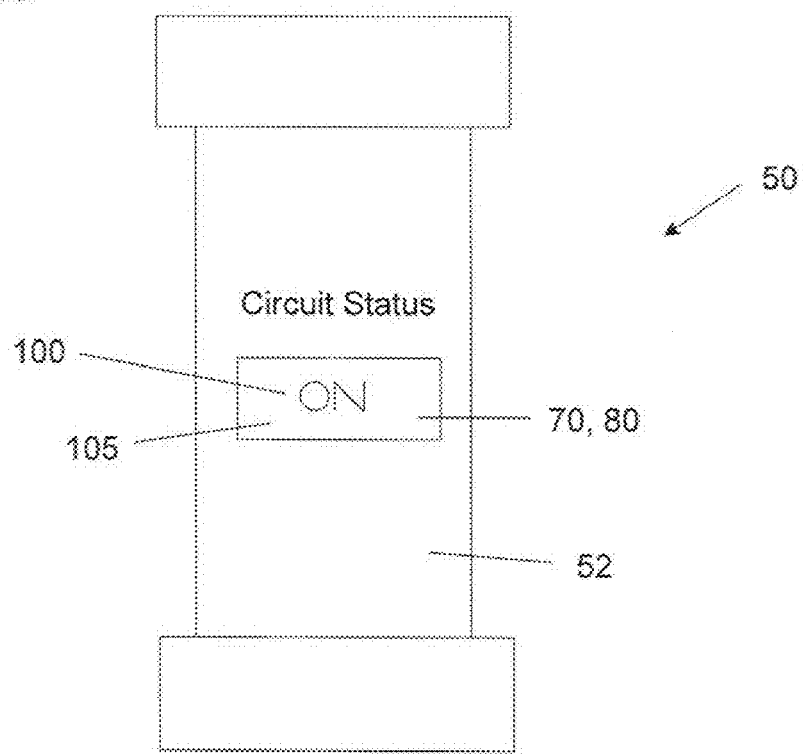
FIG. 10 is a top view of a fuse comprising a fuse state indicator displaying an operable fuse state in accordance with an exemplary embodiment.

Referring now to FIGS. 9 and 10, the various states of the fuse 50 are illustrated. In the embodiment shown in FIGS. 9 and 10, a fuse state indicator 52 comprising at least one smart window 70, 80 is illustrated.

In this embodiment, the smart window 70, 80 may further comprise a first marking 100 coupled to the backing layer 79, 68, wherein the first marking 100 indicates that the fuse 50 is operable. Although this embodiment uses the word "on" as the first marking 100, any marking may be used, including a particular color, e.g. green dot or square, or any other marking associated with an operable status, without departing from the scope and spirit of the exemplary embodiment. The first marking 100 may be marked on the surface of the backing layer 79, 88 or may be marked on a material directly or indirectly coupled to the backing layer 79, 88.

FIG. 9 is a top view of a fuse state indicator 52 displaying an inoperable fuse state 90 in accordance with an exemplary embodiment. When the smart window 70 has no voltage passing through it, the polymer dispersed liquid crystals 71 orient to the first position, which is when the molecules point in a random manner and prevent the operator from viewing the first marking 100. Similarly, in the alternative embodiment, when the smart window 80 has no voltage passing through it, the suspended particle devices 81 orient to the first position, which is when the molecules point in a random manner and prevent the operator from viewing the first marking 100. When the fuse 50 is in the inoperable fuse state 90, the polymer dispersed liquid crystals 71 and the suspended particle devices 81 both become opaque, FIG. 10 is a top view of a fuse 50 comprising a fuse state indicator 52 displaying an operable fuse state 105 in accordance with an exemplary embodiment. When the smart window 70 has voltage passing through it, the polymer dispersed liquid crystals 71 orient to the second position, which is when the molecules point in mostly the same direction and allow the operator to view the first marking 100. Similarly, in the alternative embodiment, when the smart window 80 has voltage passing through it, the suspended particle devices 81 orient to the second position, which is when the molecules line up and allow the operator to view the first marking 100. When the fuse 50 is in the operable fuse state 105, the polymer dispersed liquid crystals 71 and the suspended particle devices 81 both become translucent.

Although the embodiment described above illustrates that an electrical charge does not flow through the wire 57 when the fuse is inoperable, while an electrical charge flows through the wire 57 when the fuse is operable, the fuse and wire 57 may be designed such that the reverse occurs without departing from the scope and spirit of the exemplary embodiment. Specifically, the fuse and wire 57 may be designed so that an electrical charge flows through the wire 57 when the fuse is inoperable, while an electrical charge does not flow through the wire 57 when the fuse is operable.

Figure 11A:
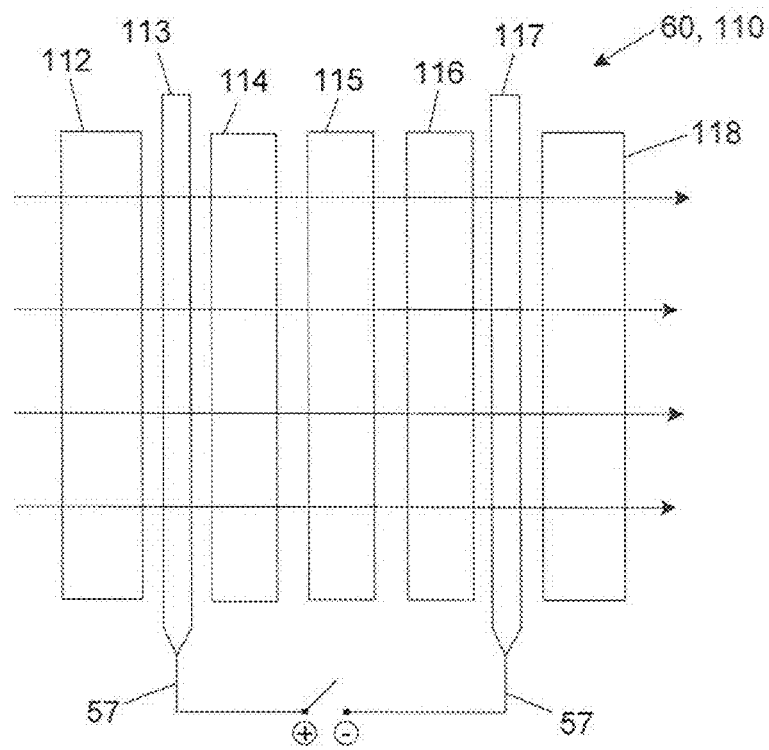
FIG. 11A is a perspective view of a smart window showing the positioning of a plurality of ions when there is no voltage flowing across the smart window in accordance with an exemplary embodiment.
Figure 11B:
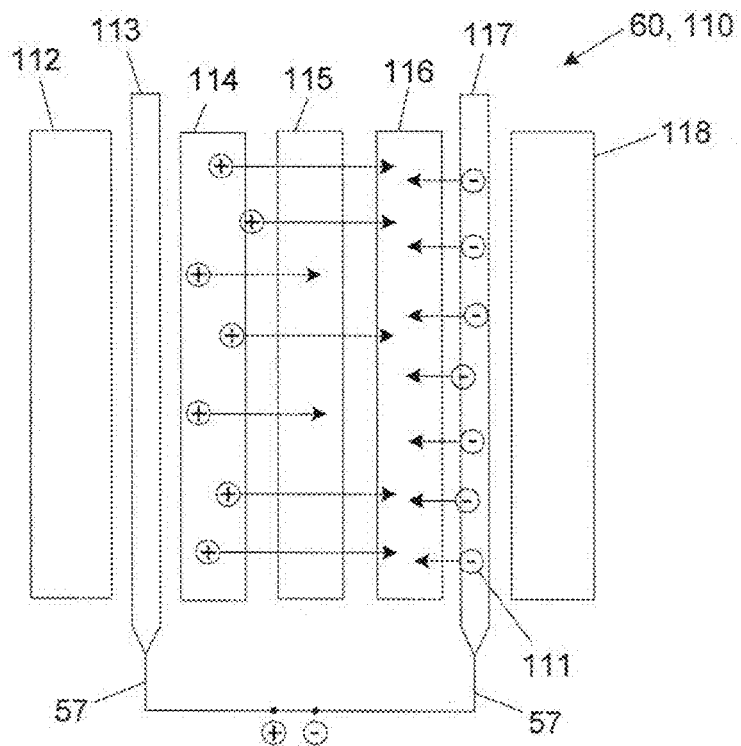
FIG. 11B is a perspective view of a smart window showing the positioning of a plurality of ions when there is voltage flowing across the smart window in accordance with an exemplary embodiment.

Referring now to FIGS. 11A and 11B, another embodiment of the voltage sensitive element 60 is illustrated and its operation is described hereinbelow. In this embodiment, the voltage sensitive element 60 comprises a smart window 110. FIG. 11A is a perspective view of a smart window 110 showing the positioning of a plurality of ions 111 when there is no voltage flowing across the smart window 110 in accordance with an exemplary embodiment. FIG. 11B is a perspective view of a smart window 110 showing the positioning of a plurality of ions 111 when there is voltage flowing across the smart window 110 in accordance with an exemplary embodiment.

As illustrated in these figures, the smart window 110 comprises a transparent lens 112, a first conductor 113 adjacent to the transparent lens 112, an ion storage layer 114 adjacent to the first conductor 113, an ion conductor/electrolyte layer 115 adjacent to the ion storage layer 114, an electrochromic layer 116 adjacent to the ion conductor/electrolyte layer 115, a second conductor 117 adjacent to the electrochromic layer 116, a backing layer 118 adjacent to the second conductor 117, and a plurality of ions 111 capable of moving between the ion storage layer 114 and the second conductor 117.

These smart windows 110 center around special materials that have electrochromic properties. "Electrochromic" describes materials that can change color when energized by an electrical current. Essentially, electricity initiates a chemical reaction in this sort of material. The reaction changes the way the material reflects and absorbs light. In this embodiment, the changes between color comprise opaque and translucent, wherein the opaque color corresponds to a first fuse state (operable fuse state) and a translucent color corresponds to a second fuse state (inoperable fuse state). Although this embodiment utilizes opaque and translucent colors, other colors maybe used without departing from the scope and spirit of the exemplary embodiment. Additionally, there may be a color gradient from opaque and translucent without departing from the scope and spirit of the exemplary embodiment.

In this design, the chemical reaction involved comprises an oxidation reaction, wherein molecules of a compound lose an electron. As shown in FIG. 11A, when there is no applied voltage to the smart window 110, the plurality of ions 111 are positioned within the ion storage layer 114, which results when the fuse is in an inoperable state. This positioning of the plurality of ions 111 allows light to pass through to the backing layer 118. Thus, the smart window 110 becomes translucent and allows the operator to view the backing layer 118. When voltage is applied to the smart window 110, as illustrated in FIG. 11B, the voltage drives the plurality of ions 111 from the ion storage layer 114 through the ion conductor/electrolyte layer 115 and into the electrochromic layer 116, which results when the fuse is in an operable state. This positioning of the plurality of ions 111 prevents light from passing through to the backing layer 118. Thus, the smart window 110 becomes opaque and prevents the operator from viewing the backing layer 118.

The electrical charge does not flow through the wire 57, which is electrically connected to the smart window 110, when the fuse is inoperable, which may result from an improperly installed fuse, an off circuit, or a fuse wherein the wire 57 may be melted or broken off due to a short circuit or an overcurrent. The electrical charge flows through the wire 57, which is electrically connected to the smart window 110, when the fuse is operable.

Although the embodiment described above illustrates that an electrical charge does not flow through the wire 57 when the fuse is inoperable, while an electrical charge flows through the wire 57 when the fuse is operable, the fuse and wire 57 may be designed such that the reverse occurs without departing from the scope and spirit of the exemplary embodiment. Specifically, the fuse and wire 57 may be designed so that an electrical charge flows through the wire 57 when the fuse is inoperable, while an electrical charge does not flow through the wire 57 when the fuse is operable.

Figure 12:
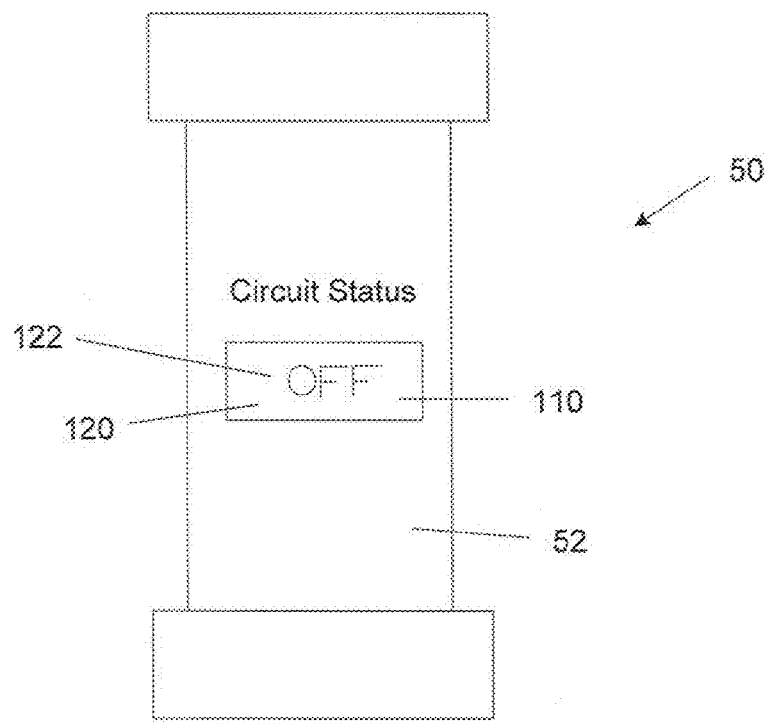
FIG. 12 is a top view of a fuse comprising a fuse state indicator displaying an inoperable fuse state in accordance with an exemplary embodiment.
Figure 13:
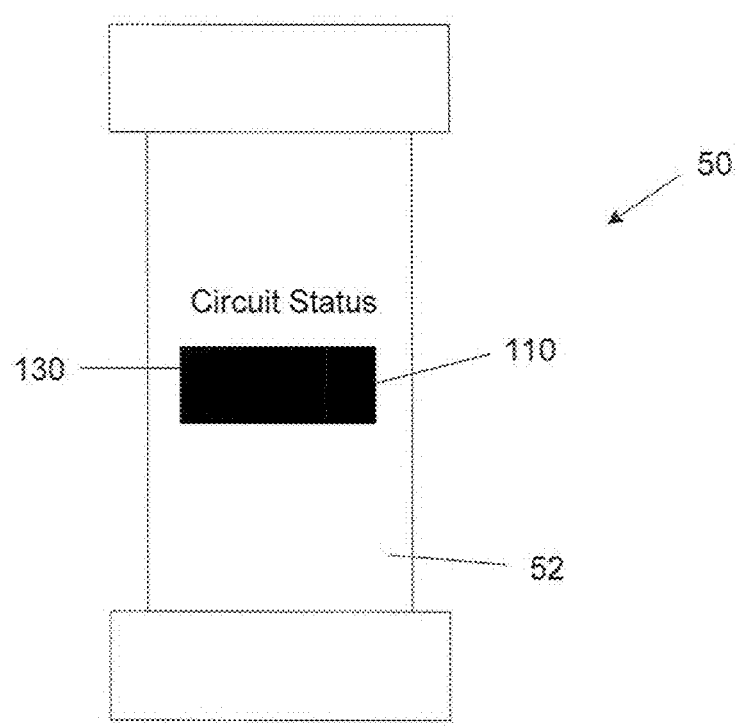
FIG. 13 is a top view of a fuse comprising a fuse state indicator displaying an operable fuse state in accordance with an exemplary embodiment.

Referring now to FIGS. 12 and 13, the various states of the fuse 50 are illustrated. In the embodiment shown in FIGS. 12 and 13, a fuse state indicator 52 comprising at least one smart window 110 is illustrated.

In this embodiment, the smart window 110 may further comprises an alternative marking 120 coupled to the backing layer 118, wherein the alternative marking 120 indicates that the fuse 50 is inoperable. Although this embodiment uses the word "off" as the alternative marking 120, any marking may be used, including a particular color, e.g. black dot or square, or any other marking associated with an inoperable status, without departing from the scope and spirit of the exemplary embodiment. The alternative marking 120 may be marked on the surface of the backing layer 118 or may be marked on a material directly or indirectly coupled to the backing layer 118.

FIG. 12 is a top view of a fuse 50 comprising a fuse state indicator 52 displaying an inoperable fuse state 122 in accordance with an exemplary embodiment. When the smart window 110 has no voltage passing through it, the plurality of ions 111 are positioned within the ion storage layer 114, which allows the operator to view the alternative marking 120.

FIG. 13 is a top view of a fuse 50 comprising a fuse state indicator 52 displaying an operable fuse state 130 in accordance with an exemplary embodiment. When the smart window 110 has voltage passing through it, the plurality of ions 111 become mostly positioned within the electrochromic layer 116, which prevents the operator from viewing the alternative marking 120.

With respect to all the embodiments described, the fuse state indicator 52 may comprise lettering to describe the fuse 50 and the fuse states. The fuse state indicator 52 may also comprise a color chart for assisting a user in identifying the meaning of the color change. To further assist operators in analyzing the status of the fuse 50, pocket cards comprising color charts may be provided to the operators.

Additionally, although the exemplary embodiments described above illustrate the fuse 50 comprising one voltage or temperature sensitive element, multiple voltage or temperature sensitive elements may be utilized without departing from the scope and spirit of the exemplary embodiment.

Furthermore, although some exemplary embodiments have been described above, it is envisioned that the various voltage and temperature sensitive elements that have been described may be used alternatively in lieu of one another or in combination with each other without departing from the scope and spirit of the invention.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A fuse comprising:
   a fuse body having an exterior surface;
   electrical terminal elements coupled to the fuse body; and
   a fuse state indicator on the exterior surface of the fuse body, the fuse state indicator including:
   an electrically conductive element electrically connected to and extending between the terminal elements and configured for resistive heating in an overcurrent condition; and
   a temperature sensitive element proximate the electrically conductive element and in thermal contact therewith, wherein the temperature sensitive element comprises material capable of changing color when heated to a predetermined transition temperature to form a mark on the temperature sensitive element,
   wherein the fuse state indicator is configured to form a first mark on the temperature sensitive element due to heat transferring from the electrically conductive element to the temperature sensitive element in response to a first overcurrent condition, and is configured to form a second mark, distinct from the first mark, on the temperature sensitive element due to heat transferring from the electrically conductive element to the temperature sensitive element in response to a second overcurrent condition distinct from the first overcurrent condition,
   wherein the first mark comprises an image of the electrically conductive element, and the second mark comprises an image of the electrically conductive element and deviated marks that deviate from the image of the electrically conductive element.

2. The fuse of claim 1, wherein the fuse state indicator is configured to form a third mark on the temperature sensitive element, different from the first and second marks, due to heat transferring from the electrically conductive element to the temperature sensitive element in response to a third overcurrent condition distinct from the first and second overcurrent conditions.

3. The fuse of claim 1, wherein the fuse state indicator further includes a window, the electrically conductive element being disposed between the window and the at least one temperature sensitive element.

4. The fuse of claim 1, wherein the temperature sensitive element comprises thermal paper.

5. The fuse of claim 4, wherein the thermal paper has a transition temperature between about 100 degrees C. and about 120 degrees C.

6. The fuse of claim 1, wherein the electrically conductive element comprises a wire.

7. The fuse of claim 6, wherein the wire melts about 1000 degrees C.

8. The fuse of claim 7, wherein the wire comprises a NiChrome alloy.

9. The fuse of claim 1, wherein the deviated marks extend laterally outward from the image of the electrically conductive element of the second mark.

10. The fuse of claim 1, wherein the terminal elements comprise ferrules.

11. A fuse comprising:
    a pair of spaced apart electrical terminal elements;
    an electrically conductive wire electrically connecting the electrical terminal elements and extending along a wire path, the electrically conductive wire being configured for resistive heating in an overcurrent condition;
    a temperature sensitive element adapted to change color when heated to a predetermined transition temperature, wherein the temperature sensitive element extends along at least a portion of the electrically conductive wire in thermal contact therewith and is adapted to absorb heat from the electrically conductive wire;
    wherein the temperature sensitive element is adapted to change color along a first conforming path that substantially conforms to the wire path of the electrically conductive wire in a first overcurrent condition;
    wherein the temperature sensitive element is adapted to change color at a combined second conforming path, which substantially conforms to the wire path of the electrically conductive wire, and at least one first deviating path, which deviates from the conforming path, in a second overcurrent condition that is distinct from the first overcurrent condition.

12. The fuse of claim 11, wherein the at least one first deviating path extends laterally outward from the second conforming path.

13. The fuse of claim 12, wherein the at least one first deviating path comprises a plurality of deviating paths spaced apart along the second conforming path.

14. The fuse of claim 13, wherein the temperature sensitive element is adapted to change color along a combined third conforming path that substantially conforms to the wire path of the electrically conductive wire and a plurality of second deviating paths that deviate from the conforming path in a third overcurrent condition distinct from the first and second overcurrent conditions, wherein lateral extents of the second deviating paths are greater than lateral extents of the second deviating paths.

15. The fuse of claim 11, wherein the first conforming path has a thickness that is less than a thickness of the second conforming path.

16. The fuse of claim 15, wherein the at least one first deviating path comprises a plurality of wavy lines that intersect the second conforming path.

17. The fuse of claim 14, wherein the first conforming path indicates an overload fuse state, and wherein the combined second conforming path and the at least one first deviating path indicates a short circuit fuse state.

18. The fuse of claim 11, wherein the pair of spaced apart electrical terminal elements comprises a pair of ferrules.

19. The fuse of claim 11, wherein the temperature sensitive element comprises thermal paper.

20. The fuse of claim 11, wherein the electrically conductive wire comprises a NiChrome alloy.

21. A fuse comprising:
    a fuse body having an exterior surface;
    a pair of spaced apart electrical terminal elements on the fuse body; and a fuse state indicator on the exterior surface of the fuse body, the fuse state indicator including:

a temperature sensitive element having an upper surface facing away from the exterior surface of the fuse body, the temperature sensitive element comprising a material that is capable of changing color when heated to a predetermined transition temperature to form a mark on the temperature sensitive element, an electrically conductive element extending across the upper surface of the temperature sensitive element in thermal contact therewith, the electrically conductive element electrically connecting the pair of spaced apart electrical terminal elements and being configured for resistive heating in an overcurrent condition, and a window overlying at least a portion of the upper surface of the temperature sensitive element and at least a portion of the electrically conductive element, wherein the fuse state indicator is configured to form an image of the electrically conductive element on the temperature sensitive element due to heat transferring from the electrically conductive element to the temperature sensitive element in response to an overcurrent condition.

22. The fuse of claim 21, wherein the temperature sensitive element comprises thermal paper.

23. The fuse of claim 22, wherein the predetermined transition temperature of the thermal paper is between about 100 degrees C. to about 120 degrees C.

24. The fuse of claim 21, wherein the electrically conductive element comprises a wire.

25. The fuse of claim 24, wherein the wire has a melting temperature above 1000 degrees C.

26. The fuse of claim 25, wherein the wire comprises NiChrome alloy.

27. The fuse of claim 21, further comprising a label defining the window therewithin.

28. The fuse of claim 24, further comprising at least one foil coupled to the wire.

29. The fuse of claim 21, wherein said at least a portion of the upper surface of the temperature sensitive element and said at least a portion of the electrically conductive element are visible through the window.

30. The fuse of claim 21, wherein the fuse body has opposite longitudinal ends and a length extending therebetween, wherein the pair of spaced apart electrical terminal element are on the opposite longitudinal ends of the fuse body, the electrically conductive element extending longitudinally, with respect to the fuse body, across the upper surface of the temperature sensitive element.

\* \* \* \* \*